United States Patent [19]
Aleksicy

[11] Patent Number: 5,977,980
[45] Date of Patent: Nov. 2, 1999

[54] METHOD AND APPARATUS FOR DETERMINING VISIBILITY OF A PIXEL

[75] Inventor: Milovoje M. Aleksicy, Richmond Hills, Canada

[73] Assignee: ATI Technologies, Ontario, Canada

[21] Appl. No.: 08/892,473

[22] Filed: Jul. 14, 1997

[51] Int. Cl.$^6$ .................................................. G06T 15/40
[52] U.S. Cl. ......................................... 345/422; 345/421
[58] Field of Search .................................. 345/422, 423, 345/418, 419, 421

[56] References Cited

U.S. PATENT DOCUMENTS

| | | | |
|---|---|---|---|
| 4,855,938 | 8/1989 | Gonzalez-Lopez et al. | 395/122 |
| 5,268,995 | 12/1993 | Diefendorff et al. | 395/122 |
| 5,734,806 | 3/1998 | Narayanaswami | 345/422 |
| 5,819,017 | 6/1998 | Akeley et al. | 345/422 |

*Primary Examiner*—Phu K. Nguyen
*Assistant Examiner*—Cliff N. Vo
*Attorney, Agent, or Firm*—Markison & Reckamp

[57] ABSTRACT

A method and apparatus for determining visibility of determining a pixel during video rendering is accomplished by determining z-positioning information of an object element. The z-positioning information is representative of the z-information of an object element in a particular section of the display. For example, the z-positioning information may be the two most significant bits of the z-parameter, or information, of an object element. Having determined the z positioning information, a comparison is made between the z positioning information of the object element and z positioning information stored in temporary memory. If this is the first object element being rendered, the z positioning information stored in the temporary memory will be initial z positioning information. When the comparison is favorable, i.e., the object element is in the foreground with respect to the z positioning information stored in the temporary memory, the temporary memory is updated with the z positioning information of the object element. In addition, a z buffer, or z memory, is updated with the z information of the object element.

21 Claims, 5 Drawing Sheets

METHOD AND APPARATUS FOR DETERMINING VISIBILITY OF A PIXEL

TECHNICAL FIELD OF THE INVENTION

This invention relates generally to video graphics processing and more particularly to determining visibility of pixels prior to video rendering.

BACKGROUND OF THE INVENTION

Video graphic circuits are known to generate pixel information for objects to be displayed on a computer screen, monitor, or television. The source for the object may be television broadcasts, cable television transmissions, satellite television transmissions, computer programs, video games, web pages, and so on. For computer screens, video graphic circuits partition each of the objects to be displayed into triangles. Each triangle is stored as three vertexes and corresponding display parameters for each vertex. The corresponding display parameters include color parameters (red, green, blue), display, or pixel location parameters (x,y,z), and texture parameters (s,t,w).

For the corresponding display parameters, a video graphics circuit calculates slopes and associated display parameters for each part within the triangle based on the slopes and corresponding display parameters. The slopes are associated display parameters and are stored in a triangle descriptor list, which is subsequently used to calculate pixel information.

When a two-dimensional objects, or one triangle, is to be displayed, there are no unnecessary steps to the process described above. When more than one object is to be displayed and the objects overlap, there are unnecessary steps because pixel information is calculated for each triangle of each object. When all of the pixel information for each object is calculated, a comparison is performed to determine which object is in the foreground. For the object that is in the background with respect to another object, the pixel information for the portion of the object that is overlapped is discarded. Thus, the calculation of such pixel information was unnecessary and adversely affects the efficiency of the video graphics circuit.

If only a small portion of an object is overlapped, the amount of unnecessary pixel information calculation is minimal and has little adverse affects on the efficiency of the video graphics circuit. If, however, the object has substantial overlapped portion, then the number of unnecessary calculations increases and the efficiency of the video graphics circuit is affected. The problem is compounded when there are several objects that overlap where only one of them will be in the foreground and displayed in its entirety. For example, assume that several faces are to be displayed and they overlap. To begin the display process, the video graphics circuit calculates the slopes and associated display premise for each triangle of a face, which includes up to 20,000 triangles, and stores the value in the triangle descriptor list. Next, the video graphics circuit calculates pixel information for a face based on the information in the triangle descriptor list and stores the pixel information. The process is repeated for each face to be displayed. Once all of the pixel information is generated, the video graphics circuit compares the component of the faces to determine which one is in the foreground in the overlapped areas.

As such, all of the calculations to obtain the pixel information in the overlapped portions of the objects not in the foreground is unnecessary adversely affecting the efficiency of the video graphics circuit. Therefore, a need exists for a method and apparatus that avoids unnecessary pixel information calculation and thereby improving the efficiency of the video graphics circuits.

DETAILED DESCRIPTION OF THE DRAWINGS

Generally, the present invention provides a method and apparatus for determining visibility of a pixel during video rendering. This may be accomplished by determining z-positioning information of an object element. The z-positioning information is representative of the z-information of an object element in a particular section of the display. For example, the z-positioning information may be the two most significant bits of the z-parameter, or information, of an object element. Having determined the z positioning information, a comparison is made between the z positioning information of the object element and z positioning information stored in temporary memory. If this is the first object element being rendered, the z positioning information stored in the temporary memory will be initial z positioning information. When the comparison is favorable, i.e., the object element is in the foreground with respect to the z positioning information stored in the temporary memory, the temporary memory is updated with the z positioning information of the object element. In addition, a z buffer, or z memory, is updated with the z information of the object element, where the z information equals the z value at each pixel of an object element. With such a method and apparatus, the computations needed to determine which object element is in the foreground have been substantially reduced since only a small portion of the z parameter, or information, is being used for a majority of the computation. Thus, the overall efficiency of the video graphics circuit is improved since complete pixel information for each object element when in a background position does not have to be calculated.

Figure 1:
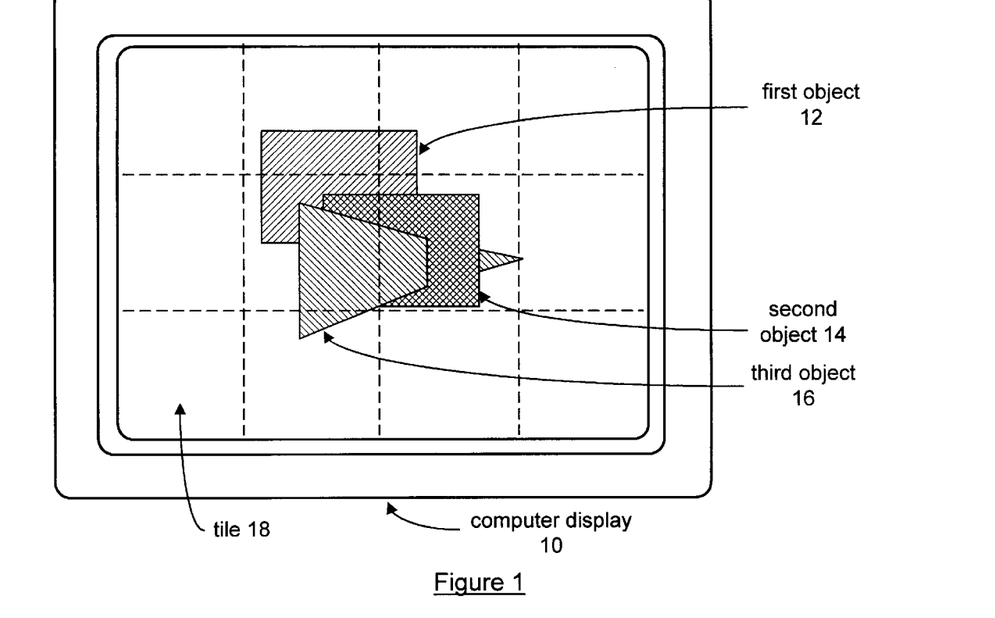
FIG. 1 illustrates a graphical representation of a computer display which is in accordance with the present invention.

The present invention can be more fully described with reference to FIGS. 1 through 6. FIG. 1 illustrates a graphical representation of the computer display 10 that is displaying three objects 12, 14, and 16. The figure further illustrates the computer display 10 being divided into a plurality of tiles 18. The size and number of the tiles may vary depending on the size of the computer screen and the computational powers of the video graphics circuit. For example, the number of tiles may be 20×20, or 400. As shown, the first object 12 and the second object 14 are planar rectangles. In other words, the z component for each of these objects is a fixed value. The third object 16 is shown as a triangle that is in three-dimensional space. As such, the z parameter varies depending on the particular pixel location of the object. As shown, the third object 16 is shown to intersect the second object 14.

As can be deduced from the illustration, the z component for the second object 14 will be less than the z information for the first object 12, i.e., in the second object 14 is in foreground with respect to the first object 12. As is generally understood, the z information, or z parameters is represented by a binary number that may be from 8 to 64 bits in length, wherein the value ranges from 0 (which represents the most foreground position) to 1 (which represents the most background position), in decimal. As can be further deduced from the illustration, the z component of the second object 14 is in the foreground with respect to a portion of the third object 16 and is in the background with respect to another portion of the third object 16.

Figure 2:
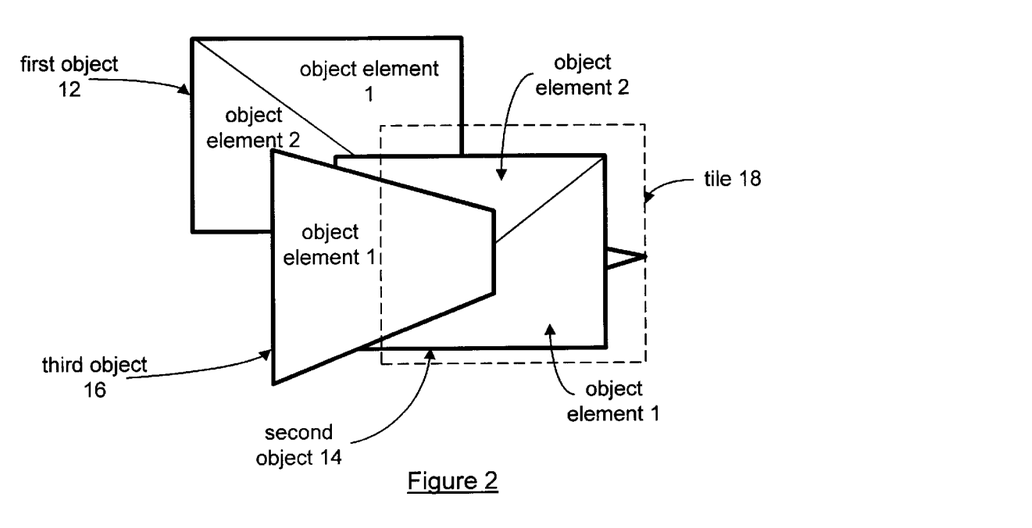
FIG. 2 illustrates a more detailed view of a portion of the computer display which is in accordance with the present invention.

FIG. 2 illustrates the three objects 12, 14 and 16 each being comprised of at least one object element. As shown, the third object 16 has one object element, the entire triangle, while the first and second objects 12 and 14 each include two object elements. As one skilled in the art would readily appreciate, the object elements may have a different polygon shape than the triangle shown and each object may be divided into more object elements.

To render the three images in tile 18, each object element of each object is individually rendered. A detailed discussion of the video rendering of object elements may be obtained by reviewing co-pending patent application having a docket number of 08/846,600 assigned to the same assignee as the present invention and having a title Method and Apparatus for Three Dimensional Graphics Processing. For the given tile 18, an initial z positioning information value is assigned and stored in temporary memory. The initial z positioning information may be the two most significant bits of the maximum or minimum value of the z information. The z information may be 0000 0000 (most foreground position) to 1111 1111 (most background position), for an eight bit z information value. As one skilled in the art will readily appreciate, the z positioning information may include more than the two most significant bits of the z information.

Having stored the initial z positioning information in the temporary memory, the z positioning information for each object element of the objects 12, 14, and 16 is determined. The z positioning information for each object element of the first and second objects is a constant value. For object elements of the third object 16, which has a varying z component throughout the object, the z positioning information will be the z information value that is in the most background. For example, if the vertex parameters of the third object 16 have a z component of 0.2, 0.3, and 0.4, the 0.4 value would be used. Further assume that the z positioning information for the second object 14 is 0.35 and the z positioning information for the first object is 0.45. For this example, when the z positioning information of the third object is compared with the z positioning information of the second object, the comparison would be unfavorable. The unfavorable results because the z positioning information (0.4) of the third object is greater than the z positioning information (0.35) of the second object.

When either the z positioning information of second object 14 or the third object 16 is compared with the z positioning information of the first object, the comparison would be favorable since both are in a foreground position with respect to the first object 12. Thus, by generalizing the z parameter for an object element within a particular tile, a quick computation may be performed to determine whether the entire object element, within a tile, is in a foreground with respect to other object elements in the tile. If, however, the quick calculation cannot confirm the object elements being in the foreground or the background with respect to other object elements, a complete comparison of the z parameters needs to be performed on a pixel by pixel basis within the tile.

Figure 3:
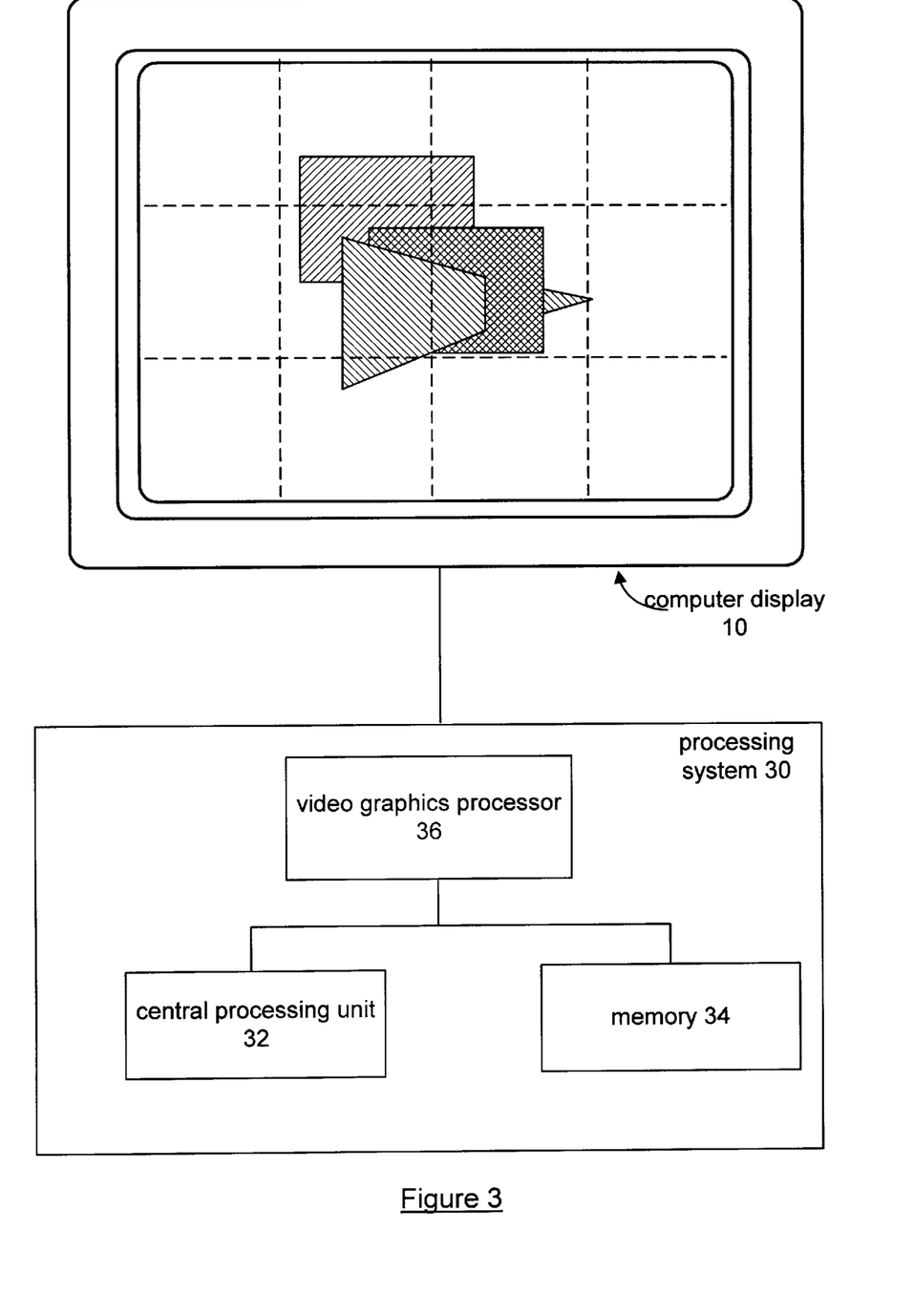
FIG. 3 illustrates a processing system that is in accordance with the present invention.

FIG. 3 illustrates a schematic block diagram of a processing system 30 that includes a video graphics processor 36, a central processing unit 32, and memory 34. The processing system 30 is operably coupled to the computer display 10 and provides the pixel information to the computer display 10 for subsequent display. Note that the central processing unit 32 may be a micro-processor, micro-controller, micro-computer, or any other device which manipulates digital information based on programming instructions. Further note that the video graphics processor 36 may be a stand-alone processing device such as a micro-processor, digital signal processor, etc., or may be a part of the central processing unit. Still further note that the memory 34 may be read-only memory, random access memory, floppy disk memory, hard drive memory, CD ROM memory, magnetic tape memory, or any other means for storing digital information.

Figure 5:
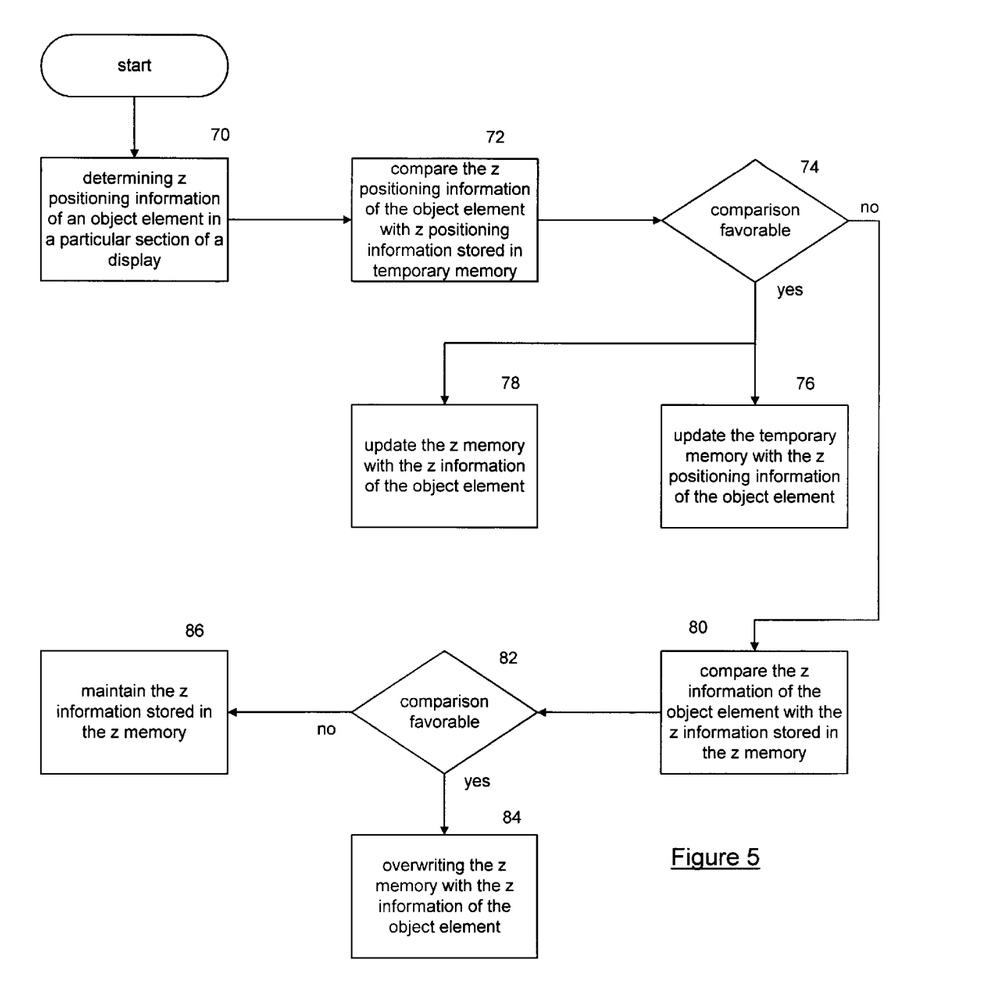
FIG. 5 illustrates a logic diagram which may be used to determine visibility of a pixel which is in accordance with the present invention.
Figure 6:
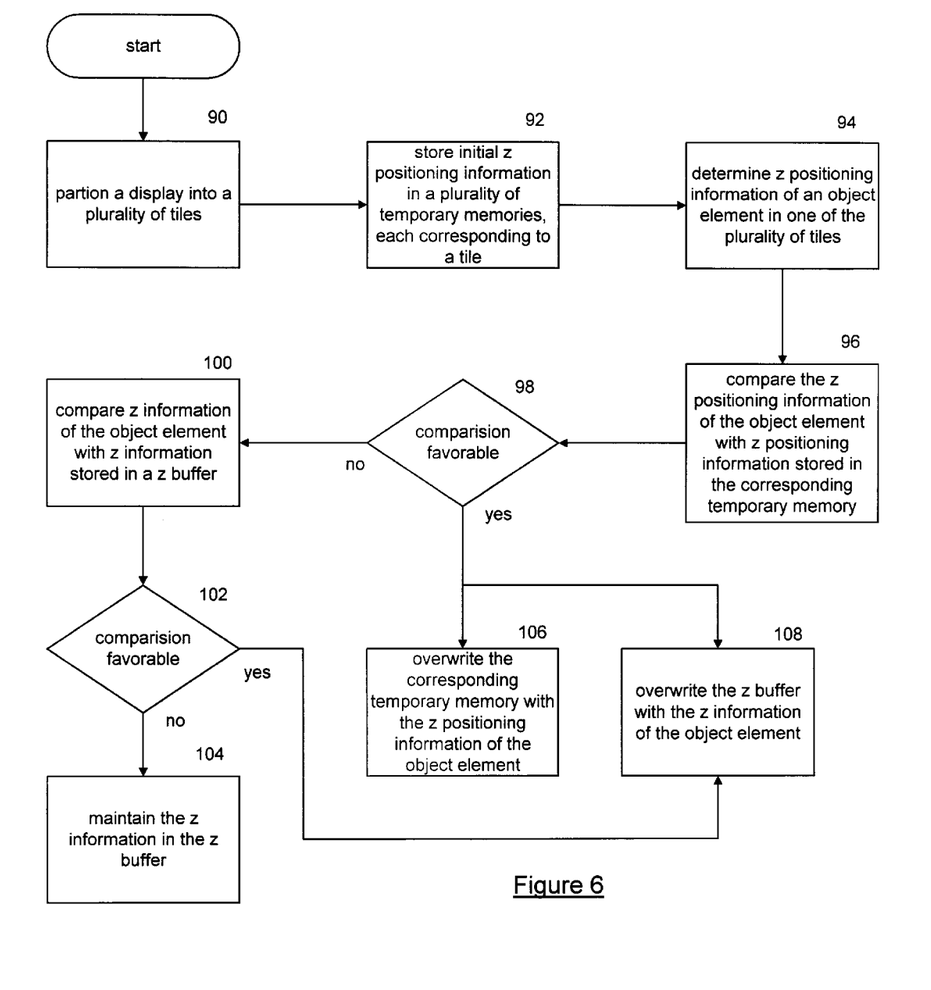
FIG. 6 illustrates another logic diagram which may be used to determine visibility of a pixel which is in accordance with the present invention.

In operation, the video graphics processor 36 and/or the central processing unit 32 perform programming instructions to achieve the processes illustrated in FIGS. 5 and 6. FIGS. 5 and 6 will be discussed in greater detail below.

Figure 4:
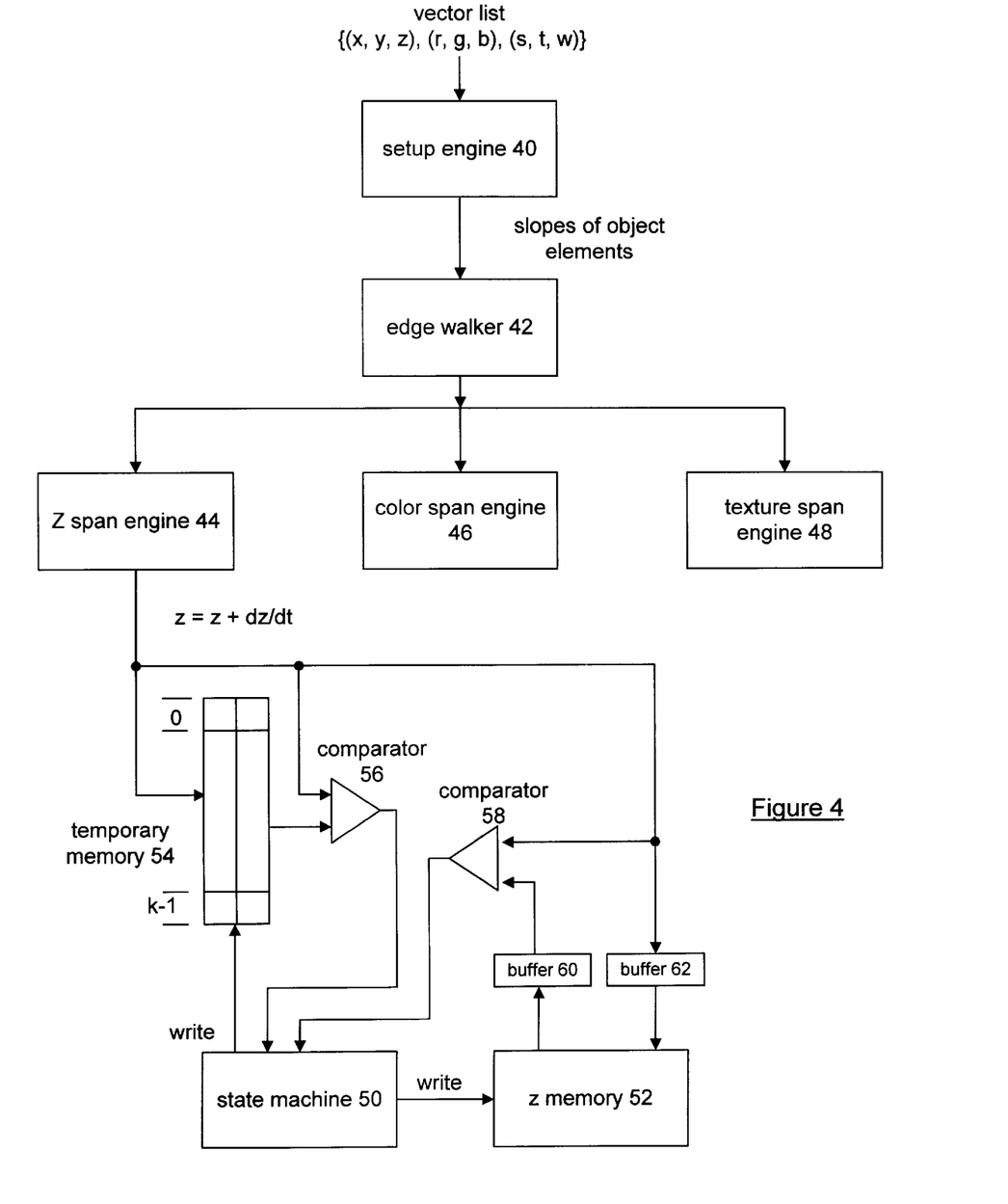
FIG. 4 illustrates a schematic block diagram of a video graphics processor which is in accordance with the present invention.

FIG. 4 illustrates a schematic block diagram of the video processor 36 which includes a set-up engine 40, an edgewalker circuit 42, a Z span engine 44, a color span engine 46, and a texture span engine 48. A detailed discussion of the set-up circuit engine 40, edgewalker circuit 42, the color span engine 46, and a texture span engine 48 may be obtained by reviewing co-pending patent application having a docket number of 08/846,600 having the same assignee as the present invention and entitled Method and Apparatus for Three Dimensional Graphics Processing.

The Z span engine 44 generates z information from data received from the edgewalker circuit 42. The z information is based on a particular object element and is incremented as the particular object element is spanned. The z span engine 44 provides the z positioning information to the temporary memory 54 and provides z information to comparator 56, comparator 58, and buffer 62. The temporary memory 54 contains locations for k–1 entries where k equals the number of tiles of the computer screen. The temporary memory 54 is shown to include two bits per entry but may include more bits depending on the granularity of comparison desired. In operation, the temporary memory 54 will store the two most significant bits of the z information, or z parameter, as the z positioning information when instructed to write the data from a state machine 50. The state machine instructs the temporary memory to store the z positioning information based on the output of comparator 56.

Comparator 56 compares the current z positioning information with z positioning information stored in the temporary memory for a particular tile. Note that the circuit of FIG. 4 would include a temporary memory, a pair of comparators, a pair of buffers, and z memory for each tile of the computer screen. If the current z positioning information is favorable, i.e., less than, the z positioning information stored in memory 54, the state machine 50 causes the temporary memory 54 to store the new z positioning information and the z memory to store the new z information. If, however, the new z positioning information does not compare favorably with the stored z positioning information, the state machine 50 does not enable the temporary memory 54 to be overwritten with the new z positioning information. In addition, under these circumstances, the state machine 50 enables comparator 58 to compare the current z information with the stored z information. If the comparison is favorable, the state machine 50 causes the z memory 52 to be overwritten with the current z information otherwise, the z memory maintains the stored z information. The comparison done by comparator 58 is facilitated with buffers 60 and 62 wherein buffers 60 stores the stored z information from the z memory and buffer 62 stores the current z information from the Z span engine.

FIG. 5 illustrates a logic diagram which may be used to determine visibility of pixels for object elements. The process begins at step 70 where a determination is made regarding z positioning information of an object-element. The particular object-element is located within a particular section of a display. Such a particular section of a display is often referred to as a tile and the number of the tiles per computer screen may vary greatly from a few dozen to several thousand. The process then proceeds to step 72 where the z positioning information of the object-element is compared with z positioning information stored in temporary memory. If this is the first object-element to be rendered, the temporary memory will store maximum z information, i.e., information relating to the furthest most background position. If however, this is not the first object-element to be rendered, the z positioning information will be the z positioning information of another object-element.

The process then proceeds to step 74 where a determination is made as to whether the comparison was favorable. The comparison would be favorable when the current z positioning information is in the foreground position with respect to the z positioning information stored in temporary memory. As previously noted, the object-element is assigned a single z positioning value for the entire tile. Thus, if the object-element has three-dimensions to it, the z positioning information will be the most background position.

If the comparison was favorable, the process proceeds to steps 76 and 78. At step 76, the temporary memory is updated with the z positioning information of the object-element. At step 78, the z memory is updated with the z information, or z parameters, of the object-element. Having done this, the process would repeat for each object-clement of each object being displayed within the tile, then for all other objects in the other tiles of the computer screen.

If, however, the comparison was unfavorable, the process proceeds to step 80 where a comparison is made between the z information of the object-element and the z information stored in the z memory. If this is the first object-element being rendered, the z information stored in the z memory will be reflective of the most background position. The process then proceeds to step 82 where a determination is made as to whether the comparison was favorable. Such a comparison is favorable when the object-element is completely in a foreground position with respect to the stored z information within the z memory.

If the comparison was favorable, the process proceeds to step 84 where the z memory is overwritten with the z information of the object-element. If, however, the comparison was not favorable, the process proceeds to step 86, where the stored z information is maintained within the z memory. When the comparison of step 74 was not favorable, the process repeats from step 80 for each pixel location of each object-element of each object being displayed on the computer screen. Once all of the pixel locations have been processed for all the object elements within the tile, the object-elements in a foreground position, as indicated by the z memory, will be rendered.

FIG. 6 illustrates a logic diagram which may be used to determine visibility of pixels of object-elements. The process begins at step 90 where a display is partitioned into a plurality of tiles. The process then proceeds to step 92 where initial z positioning information is stored in a plurality of temporary memories, where each of the plurality of temporary memories correspond to one of the plurality of tiles.

The process continues at step 94 where z positioning information is determined for an object-element which resides in one of the plurality of tiles. The process then proceeds to step 96 where the z positioning information of the object is compared with z positioning information stored in the corresponding temporary memory of the particular tile. Having done this, the process proceeds to step 98 where a determination is made as to whether the comparison was favorable.

If the comparison was favorable, the process proceeds to step 106 and 108. At step 106, the corresponding temporary memory is overwritten with the z positioning information of the object-element. At step 108, the z buffer is overwritten with z information of the object-element.

If, however, the comparison was unfavorable, the process proceeds to step 100. At step 100, the z information of the object-element is compared with the z information stored in the z buffer on a pixel by pixel basis. The process then proceeds to step 102 where a determination is made as to whether the comparison was favorable. If not, the process proceeds to step 104 where the z buffer maintains the z information. IF, however, the comparison was favorable, the process proceeds to step 108 where the z buffer is overwritten with the z information of the object-element.

The preceding discussion has presented a method and apparatus for determining visibility of pixels prior to rendering object-elements. This is generally accomplished by utilizing z positioning information for object-elements that reside in tiles of a computer display. For each object-element within a tile, it is assigned a single z positioning information value based on z parameters of the object element. Using this information, a comparison between object-elements may be made such that, if an object-element is clearly in a foreground position with respect to another, the complete z comparison does not need to be made. When partial comparisons can be done to obtain accurate information, the overall efficiency of the video graphics circuit is improved.

What is claimed is:

1. A method for determining visibility of a pixel, the method comprising the steps of:

a) determining z positioning information of an object element, wherein the z positioning information is a representation of z information of the object element in a particular section of a display;

b) comparing the z positioning information of the object element with z positioning information stored in a temporary memory relating to the particular section of the display;

c) when the comparing of step (b) is favorable, updating the temporary memory with the z positioning information of the object element; and d) when the comparing of step (b) is favorable, updating z memory with the z information of the object element.

2. The method of claim 1 further comprises, prior to step (a), initializing the temporary memory with maximum z positioning information for the particular section of the display.

3. The method of claim 1 further comprises, within step (a), utilizing minimum z information of the object element to determine the z positioning information.

4. The method of claim 3 further comprises, within steps (c) and (d), determining the comparing of step (b) to be favorable when the z positioning information of the object element is less than the z positioning information stored in the temporary memory.

5. The method of claim 1 further comprises, within step (a), determining the z positioning information for a tile of the display, wherein the tile is representative of the particular section of the display.

6. The method of claim 1 further comprises, when the comparing of step (b) is not favorable, comparing the z information of the object element with the z information stored in the z memory and, when the comparing of the z information is favorable, overwriting the z memory with the z information of the object element.

7. The method of claim 1 further comprises:
determining z positioning information of a second object element, wherein the z positioning information of the second object element is a representation of z information of the second object element in the particular section of the display;
comparing the z positioning information of the second object element with the z positioning information stored in the temporary memory relating to the particular section of the display;
when the comparing of the z positioning information of the second object element is favorable, updating the temporary memory with the z positioning information of the second object element; and
when the comparing of the z positioning information of the second object element is favorable, updating the z memory with the z information of the second object element.

8. The method of claim 1 further comprises establishing the z positioning information to be at least two most significant bits of the z information.

9. A method for determining visibility of a pixel, the method comprising the steps of:
a) partitioning a display into a plurality of tiles;
b) storing initial z positioning information in a plurality of temporary memories, where, for each of the plurality of tiles, there is a corresponding one of the plurality of temporary memories;
c) determining z positioning information of an object element in one of the plurality of tiles;
d) comparing the z positioning information of the object element with z positioning information stored in the corresponding one of the plurality of temporary memories corresponding to the one of the plurality of tiles;
e) when the comparing of step (d) is favorable, overwriting the corresponding one of the plurality of temporary memories with the z positioning information of the object element;
f) when the comparing of step (d) is not favorable, comparing z information of the object element with z information stored in a z buffer; and
g) when the comparing of step (f) is favorable, overwriting the z buffer with the z information of the object element.

10. The method of claim 9 further comprises:
determining z positioning information of other object elements in the one of the plurality of tiles;
comparing the z positioning information of the other object elements to the z positioning information stored in the corresponding one of the plurality of memories;
storing, in the corresponding one of the plurality of memories, most favorable z positioning information of either one of the z positioning information of the other object elements or the z positioning information stored in the corresponding one of the plurality of memories; and
storing, in the z buffer, z information relating to the most favorable z positioning information.

11. The method of claim 9 further comprises repeating steps (c) through (g) for an another object element in another one of the plurality of tiles.

12. A method for determining visibility of a pixel, the method comprising the steps of:
a) storing initial z positioning information in a plurality of temporary memories, where, for each of a plurality of tiles, there is a corresponding one of the plurality of temporary memories;
b) determining z positioning information of an object element in one of the plurality of tiles;
c) comparing the z positioning information of the object element with z positioning information stored in the corresponding one of the plurality of temporary memories corresponding to the one of the plurality of tiles;
d) when the comparing of step (c) is not favorable, comparing z information of the object element with z information stored in a z buffer; and
e) when the comparing of step (d) is favorable, overwriting the z buffer with the z information of the object element.

13. The method of claim 12 further comprises repeating steps (c) through (e) for another object element.

14. The method of claim 12 further comprises repeating steps (a) through (e) for another object element in another one of the plurality of tiles.

15. A video processing system comprising:
first memory for temporarily storing z positioning information;
second memory for storing z information; and
a processing unit that, based on programming instructions, (a) determines the z positioning information of an object element, wherein the z positioning information is a representation of z information of the object element in a particular section of a display; (b) compares the z positioning information of the object element with z positioning information stored in the first memory; (c) updates the first memory with the z positioning information of the object element when the z positioning information of the object element compares favorably to the z positioning information stored in the first memory; and (d) updates the second memory with the z information of the object element when the z positioning information of the object element compares favorably to the z positioning information stored in the first memory.

16. The video processing system of claim 15 further comprises the processing unit to be at least one of a microprocessor, microcomputer, microcontroller, digital signal processor and a memory for storing the programming instructions.

17. The video processing system of claim 15 further comprises, within the processing unit, a state machine.

18. The video processing system of claim 15 further comprises the processing unit executing programming instructions that cause the processing unit to determine that the z positioning information of the object element compares favorably to the z positioning information stored in the first memory when the z positioning information of the object element is less than the z positioning information stored in the first memory.

19. The video processing system of claim 15 further comprises the processing unit executing programming instructions that cause the processing unit to determine the z positioning information for a tile of the display, wherein the tile is representative of the particular section of the display.

20. The video processing system of claim 15 further comprises the processing unit executing programming instructions that cause the processing unit to compare the z information of the object element with the z information stored in the second memory and, when the comparing of the z information is favorable, overwriting the second memory with the z information of the object element.

21. A video processing system comprising:

first memory for temporarily storing z positioning information relating to a plurality of tiles;

second memory for storing z information; and a processing unit that, based on programming instructions, (a) stores initial z positioning information in the first memory for one of a plurality of tiles; (b) determines z positioning information of an object element in the one of the plurality of tiles; (c) compares the z positioning information of the object element with z positioning information stored in the first memory that corresponds to the one of the plurality of tiles; (d) compares z information of the object element with the z information stored in the second memory when the z positioning information of the object element compares unfavorably with the z positioning information stored in the first memory; and (e) overwrites the second memory with the z information of the object element when the z information of the object element compares favorably with the z information stored in the second memory.

* * * * *